US011919268B2

(12) United States Patent
Matthes et al.

(10) Patent No.: US 11,919,268 B2
(45) Date of Patent: Mar. 5, 2024

(54) SAFETY RAIL FOR A ROTARY PRESS

(71) Applicant: Korsch AG, Berlin (DE)

(72) Inventors: Michael Matthes, Dallgow-Döberitz (DE); Wolfgang Korsch, Berlin (DE); Stephan Mies, Berlin (DE)

(73) Assignee: Korsch AG, Berlin (DE)

( * ) Notice: Subject to any disclaimer, the term of this patent is extended or adjusted under 35 U.S.C. 154(b) by 891 days.

(21) Appl. No.: 16/964,768

(22) PCT Filed: Jan. 8, 2019

(86) PCT No.: PCT/EP2019/050289
§ 371 (c)(1),
(2) Date: Jul. 24, 2020

(87) PCT Pub. No.: WO2019/145138
PCT Pub. Date: Aug. 1, 2019

(65) Prior Publication Data

US 2021/0053309 A1 Feb. 25, 2021

(30) Foreign Application Priority Data

Jan. 25, 2018 (EP) .................................... 18153460

(51) Int. Cl.
*B30B 15/02* (2006.01)
*B30B 11/08* (2006.01)
(Continued)

(52) U.S. Cl.
CPC .............. *B30B 15/02* (2013.01); *B30B 11/08* (2013.01); *B30B 11/34* (2013.01); *B30B 11/085* (2013.01);
(Continued)

(58) Field of Classification Search
CPC ....... B30B 11/08; B30B 11/085; B30B 11/34; B30B 15/02; B30B 15/026; B30B 15/0023
(Continued)

(56) References Cited

U.S. PATENT DOCUMENTS 4,057,381 A 11/1977 Korsch
5,698,238 A 12/1997 Fabbri
(Continued)

FOREIGN PATENT DOCUMENTS

CN 1153106 A 7/1997
CN 1796094 A 7/2006
(Continued)

OTHER PUBLICATIONS

Shimada (JPH08281493), Oct. 29, 1996, machine translation to English (Year: 1996).*
(Continued)

*Primary Examiner* — Joseph S Del Sole
*Assistant Examiner* — Lawrence D. Hohenbrink, Jr.
(74) *Attorney, Agent, or Firm* — Wolf, Greenfield & Sacks, P.C.

(57) ABSTRACT

A rotary press comprising at least one pressing station having each of a vertically-adjustable upper and lower pressure roller, which are mounted by axes in the at least one pressing station. Cam-guided upper punches having punch heads are fed to the upper pressure roller by a control cam and a pull-up cam raises the upper punches to a highest point above a filling device. A vertically-adjustable safety cam is designed to be vertically adjustable in relation to the upper pressure roller. The rotary press may comprise a preliminary pressure cam, which is integrated in a guide block.

13 Claims, 5 Drawing Sheets

(51) Int. Cl.
*B30B 11/34* (2006.01)
*B30B 15/00* (2006.01)

(52) U.S. Cl.
CPC ......... *B30B 15/0023* (2013.01); *B30B 15/026* (2013.01)

(58) Field of Classification Search
USPC .......................................................... 425/345
See application file for complete search history.

(56) References Cited

U.S. PATENT DOCUMENTS

| | | | |
|---|---|---|---|
| 5,762,978 A | 6/1998 | Trebbi | |
| 6,186,762 B1 * | 2/2001 | Matthes | B30B 11/08 425/193 |
| 6,186,782 B1 | 2/2001 | Matthes | |
| 2009/0115090 A1 | 5/2009 | Dukler et al. | |
| 2009/0139417 A1 | 6/2009 | Lueneburg et al. | |
| 2014/0183787 A1 | 7/2014 | Ludermann et al. | |

FOREIGN PATENT DOCUMENTS

| | | | |
|---|---|---|---|
| CN | 101138891 | A | 3/2008 |
| CN | 103619575 | A | 3/2014 |
| CN | 103707547 | A | 4/2014 |
| CN | 105383085 | A | 3/2016 |
| CN | 205664966 | U | 10/2016 |
| CN | 107553964 | A | 1/2018 |
| DE | 2550672 | A1 | 11/1976 |
| DE | 26 04 648 | B1 | 6/1977 |
| DE | 197 05 092 | C1 | 3/1998 |
| EP | 1386722 | A1 | 2/2004 |
| JP | H08-281492 | A | 10/1996 |
| JP | H08281492 | * | 10/1996 |
| JP | 09-206998 | A | 8/1997 |
| JP | 10-216992 | A | 8/1998 |
| JP | 2007-260744 | A | 10/2007 |
| JP | 2009-063287 | A | 3/2009 |
| JP | 2014-176871 | A | 9/2014 |
| KR | 20120009956 | A | 2/2012 |

OTHER PUBLICATIONS

International Search Report and Written Opinion for International Application No. PCT/EP2019/050289, dated Apr. 23, 2019.

International Preliminary Report on Patentability for International Application No. PCT/EP2019/050289, dated Jan. 3, 2020.

* cited by examiner

SAFETY RAIL FOR A ROTARY PRESS

CROSS-REFERENCE TO RELATED APPLICATIONS

This Application is a national stage filing under 35 U.S.C. 371 of International Patent Application No. PCT/EP2019/050289, filed Jan. 8, 2019, which claims priority to German application number 18153460.3, filed Jan. 25, 2018, each of which is herein incorporated by reference in its entirety.

BACKGROUND

Field of Invention

The invention relates to a rotary press comprising at least one pressing station having each of a vertically-adjustable upper and lower pressure roller, which are mounted by means of axes in the at least one pressing station, wherein cam-guided upper punches having punch heads are fed to the upper pressure roller by means of a control cam and a pull-up cam raises the upper punches to a highest point above a filling device. The invention relates in particular to a vertically-adjustable safety cam, which is designed to be vertically adjustable in relation to the upper pressure roller. It can be preferable in the meaning of the invention for the rotary press to comprise a preliminary pressure cam, which is provided integrated in a guide block. The invention is also suitable for the production of multi-layer or core-coated pellets. As a result, the rotary press according to the invention comprises at least one main pressing station and also, depending on the number of the layers to be compressed, optionally further filling, metering, and/or pressing stations, and also a core insertion station and optionally pressing-on stations in the case of core-coated pellets.

Description of Related Art

It is known that rotary presses are used for the production of pharmaceutical tablets or chemical, technical, or industrial pellets in large piece counts from powdered raw materials in particular. Rotary presses generally have a rotor having circular footprint, which comprises an upper and a lower punch guide, and also a die plate arranged in between. This die plate has openings or die holes into which the material to be pressed is filled in a filling station by means of a filling device. The material filled into the die holes is metered to the desired weight by means of a metering station.

The upper and lower punches are moved axially on the rotor circumference by means of stationary control cams that are located above and below the rotor and are fastened on the respective stationary cam carriers. In rotary presses, head-guided or roll-guided punch shafts are used. The upper punch guide of the rotor is formed by axial holes in the upper part of the rotor for the upper punch shafts. The upper punch guide of the rotor is formed by axial holes in the upper part of the rotor for the upper punch shafts. These axial holes are arranged aligned with the die holes of the die plate, so that the upper punches and the lower punches can move within the die hole during the filling and pressing procedure.

The pressing of the pellets takes place in a pressing station of the rotary press. During the rotation of the rotor of the rotary press, an upper and lower punch pair are each successively drawn through two pressure rollers, which are provided arranged one over another in a pressure roller station. Such a pressure roller station is described, for example, in DE 197 05 092 C1. A pressing station is anchored fixedly in the carrier plate of a rotary press and comprises an upper and a lower pressure roller, wherein the pressure rollers are fastened by means of bearing blocks on the guide column of the pressing station and are provided arranged adjustably in relation to one another. Due to the positioning of the pressure rollers in relation to one another, the upper and lower punches are moved toward one another—when passing the pressure roller pair—whereby a pressing force is exerted on the pressing material between the punches within the die. Due to the transmission and action of the pressing force, a tablet or a pellet, respectively, is produced from the powdered pressing material.

The formation of a pellet is based on a compaction procedure, in which the pressing tools move toward one another within the die hole, wherein air possibly present, which is located between the powder particles, is pressed out of the pressing material located between the pressing surfaces of the punches. The compaction results in an essentially complete removal of air-filled intermediate spaces between the powder particles. Due to the absence of these intermediate spaces, the pressing particles obtain contact with one another, whereby interlocking and connecting of the particles with one another is achieved due onto the transmission of the pressing force to the pressing particles. A pellet is obtained which has a defined hardness. If only one pressing station is present in a rotary press, it is referred to as the main pressing station. The corresponding compaction procedure is referred to as the main compaction.

During the filling procedure, in rotary presses the upper punches are located above the filling device. If the rotary press is equipped with a pressure station, after the filling and metering procedure by the lower punches, the upper punches are guided downward in the direction of the die plate by the pull-down rail until the upper punches plunge into the die holes of the die plate. Due to the plunging, the upper punches close the die openings and form the upper terminus of the pressing chamber during the compaction procedure. The side walls of the die hole form the side walls of the pressing chamber for the pellet to be obtained in this case, while the pressing surface of the lower punches represents the lower side of the pressing chamber.

The present invention relates in particular to the control cams of the at least one pressing station, which feed the upper punches to the upper pressure roller and raise them to the highest point thereof above the filling device after the pressing procedure using the pull-up cam.

It is preferable for the upper punches to be located above the filling device during the filling and metering procedure. The upper punches are preferably lowered in the direction of the die plate at the end of the filling device by means of the pull-down cam located to the left of the upper pressure roller. Parallel to the lowering upper punches, the dies, which are filled flush with pressing material by the metering unit, leave the metering chamber of the filling device. In order that, in the preferably rapidly running high-performance rotary presses, material loss caused by the high centrifugal forces due to pressing material thrown out of the die hole does not result, it is preferable in terms of the invention for the die holes to be covered by a resilient cover rail up to the plunging point of the upper punches into the die hole. The resilient cover rail preferably ends shortly before the plunging of the upper punch into the die hole. If the die were filled flush by this point in time, at the moment of release, the die hole would be open on top and a material loss due to thrown-out material would result before the upper punch can close the upper die hole. In order to prevent this undesired loss, it is preferable in terms of the invention for the lower punches, and the flush-filled dies located below the resilient cover rail, to be pulled downward 2 to 3 mm. Since the material column in the die hole rests on the lower punch, the material column follows the lower punch movement and the upper material column is located 2 to 3 mm below the die upper edge at the end of the lower punch pull-down movement. The centrifugal force still acts on the material column, so that a slope rising outward results in the hole, which ends, for example, 1 to 1.5 mm below the die upper edge. This means that the pressing material, due to the lowering of the material column, advantageously cannot leave the die through the remaining outer hole wall—in spite of the centrifugal force.

The material lowering of 2 to 3 mm additionally provides a further advantage. If the upper punches were plunged at high speed into the flush-filled die at the end of the resilient cover rail, a spontaneous detonation and thus uncontrolled material loss would occur. In addition, a portion of ultrafine dust would escape upward out of the die hole with the rapidly escaping air from the pressing material, which disadvantageously results in losses and strong soiling of the rotary press. Due to the above-described material lowering, the upper punches no longer plunge into a flush-filled die, but rather preferably into an empty space, and the upper dies advantageously obtain contact with the pressing material for the first time after a plunging travel of 1 to 2 mm. It is preferable for the die hole to be closed by the upper punches and lower punches, and the air located in the pressing material can advantageously escape during the preliminary and main pressing procedures through the small air gap of, for example, 0.01 mm between die hole and the upper and lower punches, without a noteworthy material loss occurring.

It is known that if the upper punch, the lower punch, and the pressing material located between these pressing tools are located in the die hole, the upper punches of the rotary press are fed to the upper pressure roller and the lower punches are fed to the lower pressure roller. This is performed by means of the pull-down and pull-up cams and rails provided for this purpose. Between the pressure rollers, the pressing tools are fed further toward one another, whereby the pressing force is exerted on the pressing material which creates a stable tablet with good binding properties of the material to be compressed.

In the upper cam sequence, a pull-down cam is typically arranged to the left of the upper pressure roller, while the pull-up cam is provided arranged to the right of the upper pressure roller. The pull-down cam is responsible for lowering the upper punches in the region of the die hole, while the pull-up cam withdraws the upper punches from the die hole when the pressing procedure of the pellet is ended. In conventional rotary presses, the pull-down cam and the pull-up cam for the upper punches are two separate cam elements isolated from one another, which are fastened fixedly and stationary in a friction-locked and formfitting manner on the upper cam carrier A gap thus results below the upper pressure roller between the pulldown cam and the pull-up cam in the upper cam sequence. It is typical in conventional rotary presses that the plunging depth of the upper punches is at most 6 to 8 mm. The pull-down cam for the upper punches having a plunging depth of 2 to 3 mm contributes here to this maximum upper punch plunging depth, while the remaining plunging depth is enabled by means of the adjustable upper pressure roller.

A disadvantage of the gap located between the pull-down cam and the pull-up cam within the upper cam sequence is that the upper punches can plunge in an uncontrolled manner into the die hole in the region below the upper pressure roller. In order to counteract this risk, conventional rotary presses have a rigid security or safety cam on the inner side of the upper cam carrier. This also prevents the shaft heads of the upper punches from touching the rotor upper part of the rotary press. This is enabled in that the rigid safety cam ensures a minimum distance of the shaft heads in relation to the rotor upper part, so that the upper punches can be taken over safely and reliably by the upper punch pull-up cam from the lowest position thereof.

However, there are types of pellets which require plunging depths of the upper punches which are in a range between 10 to 25 mm and in which catching of the upper punches by a rigid safety cam can no longer be ensured due to the length of this plunging depth. Above all, it can therefore then result in damage on the pressing tools or the rotary press if pressing material is not present in the die holes, the lower punches are positioned relatively high within the die hole, or a material jam occurs within the rotary press and the die holes are only inadequately filled with powder material to be compressed. If upper and lower punches collide with one another inside the die hole without being decelerated by the powdered pressing material, fractures of the pressing punches can occur, or the pressing surfaces of the pressing tools are provided with imprints of engravings or undesired scores. Pressing tools damaged in this way are unusable for further use and have to be replaced.

In conventional rotary presses described in the prior art, the rigid safety rails are typically fastened in a lower inner region of the upper cam carrier. A low filling depth from the second layer in the case of the production of multilayered pellets is thus made more difficult, since the upper punches, due to the intrinsic weight thereof and the plunging speed, possibly compact the pressing material of the first layer in an excessively strong and uncontrolled manner, so that depending on the stiffness of the individual upper punches, a strongly varying weight of the second filling results due to the different height of the resulting free space above the pressed-on first layer.

Furthermore, due to excessively strong compaction of a first layer during the production of multilayered pellets, the surface of the upper side of the first pellet layer can be provided so smooth and closed that the occurrence of a durable connection between the pressing material of the first layer and the pressing material of the second layer is made substantially more difficult. These so-called overpressed pellets tend to split at the partition plane between the first and the second powder layer and generally have to be disposed of as rejects.

Furthermore, the use of rigid safety cams has the result that due to the differing stiffness of individual upper punches, they plunge to different depths into the die hole, whereby filling spaces of different heights are created in the die holes for the pellets to be produced. The differing stiffness of the upper punches results from the friction of the shaft surface in the guide hole of the upper punches during the upward and downward movement during the production process of the pellets. Due to the filling spaces of different sizes, pellets having varying weight, in particular of the second powder layer, are obtained, which is disadvantageous above all in the field of the application of the rotary press in the scope of the pharmaceutical industry due to the low tolerance limits existing there.

The use of rigid safety rails also results in problems in the production of core-coated pellets. A rotary press for producing core-coated pellets corresponds to a three-layer rotary press, in which the second filling device is replaced with a core insertion module. After the filling of the first layer in the die hole, it has proven to be advantageous if it is slightly pressed on by the upper pressure roller in a first pressing-on station.

This pressing on of the first powder layer during the production of core-coated pellets is also referred to in the meaning of this application as "tamping", because of which the terms "tamping station" and "pressing-on station" are used synonymously.

Due to the light pressing on of the first powder layer, a uniform horizontal and structured surface of the first powder layer is achieved, so that upon the later insertion of the pellet core, the core can be inserted into this slightly pressed-on surface without powder dust being swirled up. Omitting the pressing on of the first powder layer is linked to an array of disadvantages. On the one hand, the powdered material provided loosely in the die hole does not follow or does not completely follow the downward movement of the lower punches, so that the powder material to be compressed is provided unevenly distributed in the die hole. The insertion and the precisely centered positioning of the pellet core on the first powder layer is thus made significantly more difficult. Furthermore, a non-pressed-on surface of the powder layer has the result that upon the placement of the core in the first layer, dust is swirled up, whereby an undesired loss of powder material of the first layer occurs and the tools and the interior of the rotary press are contaminated.

It has been shown that these disadvantages can be overcome if the upper punches only plunge a short distance into the die hole at the first pressing-on station. Due to the short plunging travel, this plunging can advantageously be implemented in a defined and reproducible manner, wherein typically the upper punch is introduced in steps of 0.1 mm into the die. However, such a plunging of the pressing punches cannot be implemented or cannot be implemented using only one pressure roller, since at high speeds of the rotary press and depending on the varying stiffness of the individual upper punches, rebound movements of the lower sides of the upper punches are observed. The rebounding of the upper punches disadvantageously results in disturbed pressing force signals, which are also referred to as "noise" in the scope of this application, so that signals of the pressing-on force which move in the range of 5 to 50 N cannot be recognized. However, these pressing force signals are important to be able to judge the quality of the production sequence. In particular, a reliable pressing force signal is necessary for the automatic weight regulation, and also for sorting out flawed pellets. It can occur that a complete production batch is automatically discarded due to the faulty pressing force signals, which is undesirable.

Proceeding from this prior art, it is the object of the invention to provide a rotary press which does not have the disadvantages of the prior art with respect to the use of rigid safety cams, the open die holes, and the faulty pressing force signals.

BRIEF SUMMARY

According to the invention, a rotary press is provided comprising at least one pressing station having each of a vertically-adjustable upper and lower pressure roller, which are mounted by means of axes in the at least one pressing station, wherein cam-guided upper punches having punch heads or rollers are fed to the upper pressure roller by means of a control cam, and a pull-up cam, which raises the upper punches after the pressing procedure to a highest point above a filling device. The rotary press thus equipped is characterized in that, in the at least one pressing station below the upper pressure roller, a safety cam arranged vertically adjustable in relation to this upper pressure roller is provided.

A pressing station in the meaning of this invention is a pressing station having a vertically-adjustable upper and a vertically-adjustable lower pressure roller, between which upper and lower pressing punches are guided through by means of control cams, wherein the control cams form an upper and a lower cam sequence and the powder material to be compressed is compressed in the die holes to form pellets by bringing together the pressing punches in the region between the two pressure rollers. The upper punches are fed by means of a control cam to the upper pressure roller of the at least one pressing station and after the pressing procedure are raised using a pull-up cam to the highest point thereof above the filling device.

The pressing station according to the invention can advantageously be a main pressing station or a preliminary pressing station. In a main pressing station of a rotary press, the powder material to be compressed is compressed to form pellets in that the powder particles are connected to one another due to the applied main pressing force. In a preliminary pressing, tamping, or preliminary pressure station, a powder material located in a pressing chamber is slightly pressed on using a lower preliminary pressure, tamping, or preliminary pressing force in comparison to the main pressing force. An average person skilled in the art knows that the utilization of a preliminary pressing, tamping, or preliminary pressure station is used for deaerating the powder material to be compressed or, in the case of the production of multilayered or core-coated tablets, the preparation of the lower powder layer for accommodating the tablet core or further material layers. Due to the deaerating of the pressing material, the air located between the powder particles advantageously escapes from the pressing material. It is thus advantageously possible that the time which is available for pressing the pellets in the main pressing station is substantially exclusively available for the pressing procedure and no longer also has to be used for deaerating. This improves the stability of the obtained pellets and thus increases the product quality.

In the at least one pressing station of the rotary press, a safety cam vertically adjustable in relation to this upper pressure roller is provided below the upper pressure roller. The safety cam is advantageously designed to be vertically adjustable in relation to the upper pressure roller, so that the distance between the safety cam and the upper pressure roller is variably settable. The vertical adjustability of the safety cam according to the invention enables the variation of the upper punch plunging depth and the pressing-on force. It is preferable in terms of the invention for the vertical adjustment of the safety cam to be performed synchronously in particular, specifically, for example, by the coupling to the pressure roller pin. It is particularly preferable for the vertical adjustment of the safety cam to preferably be able to be performed automatically with the adjustment of the upper preliminary pressure roller.

It is preferable for the safety cam to be formed as a closed cam. By means of this closed cam, the pressing-on force is transferred to the heads of the upper punches without the punch heads coming into contact with the upper pressing-on roller. Since the safety cam according to the invention is closed at the bottom, it advantageously also fulfills the function of a safety cam in the meaning that the upper punches are prevented from entering the die holes in an uncontrolled manner and being able to come into mechanical contact with the lower punches. Tool damage is thus advantageously precluded.

In a further preferred embodiment, the invention relates to a vertically-adjustable safety cam, which, upon the passage of the upper punches along a bottom dead center of the upper pressure roller, has a minimum distance of preferably 0.09 to 0.11 mm, particularly preferably 0.1 mm, to the punch heads of the upper punches. It is preferable for the safety cam according to the invention to be located in a pressing position at a distance of preferably 0.09 to 0.11 mm, particularly preferably 0.1 mm, below the punch head of an upper punch when the punch heads of the upper punches pass the upper pressure roller. The safety cam is advantageously furthermore connected at a defined distance to the upper pressure roller axis in this case. Due to the connection according to the invention between safety cam and upper pressure roller axis, the upper safety cam automatically follows an adjustment of the upper pressure roller. Independently of the position of the upper pressure roller, the safety rail advantageously has a minimum safety distance of preferably 0.09 to 0.11 mm, particularly preferably 0.1 mm, to the bottom dead center of the upper pressure roller at all times. This safety distance advantageously increases due to the height of the punch heads of the upper punches. Uncontrolled plunging of the upper punches into the die holes is thus reliably prevented, whereby damage to pressing tools due to undesired mechanical punch contacts is avoided. Furthermore, impermissibly large gross filling depths in multilayered tablets, which result in varying tablet weights, are reliably prevented.

In a further preferred embodiment, the invention relates to a safety cam which is provided connected by means of a connector to the axis of the upper pressure roller. The connection according to the invention between safety cam and upper pressure roller axis by means of a connector has proven to be particularly advantageous for the production of very flat single-layer tablets, since the safety cam according to the invention is located at a distance of only 0.09 to 0.11 mm below the upper punch plunging depth.

In a further preferred embodiment, the adjustment of the safety cam in relation to the pressure roller is performed manually and/or automatically. A manual and/or automatic embodiment of the adjustability of the safety cam in relation to the pressure roller advantageously ensures a flexible usage of the rotary presses according to the invention, wherein it is possible in particular to respond to individual customer requests.

In a further preferred embodiment, the invention relates to the connector between safety cam and upper pressure roller axis, which has a hole provided applied to a flanged bushing, wherein the flanged bushing is provided attached to the rear, back end face of the axis of the upper pressure roller. It is furthermore preferable for the connector to be able to be axially and radially attached and/or guided by means of recesses in the rear sides of a pull-down cam and a pull-up cam on an upper cam sequence. The upper cam sequence, which is formed by a circular cam carrier and advantageously consists of multiple cam elements, is used for guiding and controlling the upper punches. It is now preferable that for each pressure station which is equipped with a safety cam according to the invention, a connector is provided in the region of the upper cam sequence, which can be attached by means of recesses in the rear sides of the pull-down cams and/or the pull-up cams as components of the upper cam sequence.

The fastening of the connector to the pull-down cam and the pull-up cam is advantageously performed by means of detachable fasteners. The connector advantageously has a broad, rectangular lower region having rounded corners, which is used for the fastening on the upper cam sequence of the rotary press, and a narrow, upper region, in which a flanged bushing is provided attached in a hole, wherein the flanged bushing accommodates the axis of an upper pressure roller.

In a further preferred embodiment, the invention relates to a rotary press, in which at least one pressing station is a preliminary pressing station having vertically-adjustable upper and lower preliminary pressure rollers, wherein a closed preliminary pressure cam is provided arranged in the upper cam sequence of the at least one preliminary pressure station, which is composed of multiple cam elements. It is preferable that the closed preliminary pressure cam also functions as a safety cam for the upper punches of the rotary press, in that the closed preliminary pressure cam effectively prevents the uncontrolled plunging of the upper punches into the die holes of the die plate due to its design and its positioning within the rotary press.

Such preliminary pressure cams are used in particular for producing coated-core pellets. Coated-core pellets are pellets in which an insert is compressed in the interior of a pellet. Such an insert is also referred to as a "core". It is preferable if it is a chip or a film as an information carrier here or the core consists of a carrier material having active ingredient differing from the base material of the pellet.

In this case, the rotary press used preferably corresponds to a three-layer rotary press, in which a second filling device is replaced with a core insertion module. After the filling of the first powder layer in the pressing chamber of the die, this powder layer is advantageously lightly pressed on by an upper preliminary pressure roller, whereby a uniform, plane-parallel closed surface of the powder material is obtained. Due to this light pressing on of the surface, during the later insertion of the core, the core can be inserted on this pressed-on and smooth surface without powder dust being swirled up. In addition, the insertion of the core is facilitated in that the surface of the powder material is formed plane-parallel to the pressing surfaces of the lower punches.

It was completely surprising that a rotary press for producing coated-core pellets can be provided, in which the preliminary pressure station is equipped with a safety cam according to the invention, which enables plunging of the upper punches in the region of this preliminary pressure station by a defined and reproducibly settable amount in the range of 0.1 mm steps in the die hole.

It was furthermore completely surprising that the use of a closed preliminary pressure cam according to the invention enables improved pressing results in comparison to the use of a pressure roller. In particular, a homogeneous plunging of the upper punches into the die holes is ensured by the use of the closed preliminary pressure cam according to the invention in the sense that all upper punches enter the die holes with an equal plunging depth, except for a nearly infinitesimal tolerance.

By ensuring a consistent plunging depth for all upper punches, it is advantageously ensured that the pressing force signals, as an important measured variable for characterizing the production procedure, can be recognized and analyzed reliably without noise signals. It was completely surprising that thus in particular an improved weight regulation of the obtained pellets can be provided. Furthermore, sorting out flawed pellets is facilitated by the improved reliability of the pressing force signals, whereby incorrect sorting out of pellets, the weight of which is within a permissible tolerance range, is reliably avoided.

It is preferable that the closed preliminary pressure cam forms a lower region of a guide block, in which the upper cam sequence of the at least one preliminary pressure station is provided in an integrated manner. The guide block can consist of plastic in particular, however, it can also be preferable for other applications if the guide block consists of another material, for example, metal. The terms guide block and plastic guide block are used synonymously hereinafter. In particular, the lower region of the plastic guide block is formed by three different regions: centrally in the lower region of the guide block, the region of the safety cam is located, with which the punch heads of the upper punches interact in such a way that they are caught by this safety cam in the event of possible uncontrolled falling. Proceeding from the center, lower region of the guide block, the regions of the pull-down cam and the pull-up cam for the upper punches extend to the left and right.

An average person skilled in the art knows that the punch heads of the upper punches are guided along the pull-down cam in a working region below the upper pressure roller, where the pressing procedure for producing the pellets takes place. An average person skilled in the art also knows that in the region of the pull-up cam, the punch heads of the upper punches are again guided to the starting height of the upper punches predetermined by the design of the upper cam carrier after completion of the pressing procedure. The three regions of the plastic guide block are advantageously connected to one another so that smooth guiding of the punch heads is enabled.

In a further preferred embodiment, the plastic guide block is designed so that it has a front side, a rear side, and lateral surfaces, wherein the front side and the rear side of the plastic block have a uniform curve outward, wherein the curve of the front side and rear side of the plastic guide block reproduces a circular footprint of a rotor of the rotary press. The front side of the plastic guide block is the side of the guide block facing toward an external observer. The back side of the plastic guide block, in contrast, faces toward the central components of the rotary press, in particular the rotor and the die plate. An average person skilled in the art knows that, for example, the rotor of a rotary press generally has a circular footprint and is centrally mounted around an axis of rotation. The rounding of this rotor of the rotary press is reproduced by the front side and the rear side of the plastic guide block in such a way that the guide block has substantially the same rounding as the rotor in the region of the rotor.

With the aid of the appended figures of the present application, an average person skilled in the art recognizes that the guide block does not completely enclose the rotor of the rotary press, but rather is only provided in the region of a pressing station and therefore only follows the rounding of the rotor in a defined angle range. It is preferable that this angle range is substantially equal for the front side and the rear side of the guide block, whereby the curve of the front side and the rear side of the plastic guide block is formed identically. In particular, the curve of the upper plastic guide block is always curved outward. The term "outward" in terms of this invention means that the curve faces toward an external observer of the upper cam sequence.

In a further preferred embodiment, the plastic guide block comprises a receptacle hole for the upper preliminary pressure roller. The closed preliminary pressure cam for the upper punches is preferably located in a solid plastic guide block, which additionally comprises a receptacle hole for the upper preliminary pressure roller. This guide block is pushed onto the upper preliminary pressure roller with its curve outward, whereby preferably a connection is formed between preliminary pressure cam and upper preliminary pressure roller. If the preliminary pressure roller is vertically adjusted, the plastic guide block advantageously follows this vertical adjustment automatically. The closed preliminary pressure cam advantageously also follows an adjustment of the upper preliminary pressure roller as part of the upper plastic guide block. Due to the design according to the invention of the preliminary pressure roller, the closed preliminary pressure cam always has, independently of the position of the upper pressure roller, the preferred safety distance of preferably 0.09 to 0.11 mm, particularly preferably 0.1 mm to the bottom dead center of the upper preliminary pressure rail. This safety distance advantageously increases due to the head height of the upper punch heads, whereby an undesired contact of upper and lower punches in the die holes of the die plate is prevented. It is preferable in terms of the invention that the guide block having the integrated preliminary pressure rail is seated with the large hole directly on the upper preliminary pressure roller. The vertical adjustment preferably takes place automatically and synchronously with the adjustment of the upper preliminary pressure rollers.

In a further preferred embodiment, the lateral surfaces of the plastic guide block are formed rounded, wherein the rounded lateral surfaces engage in counter roundings of the cam elements adjoining in the upper cam sequence of the at least one preliminary pressure station on the guide block. An average person skilled in the art knows how rounded lateral surfaces of a plastic guide block have to be formed and can be produced to interact with counter roundings of the adjoining cam elements. Interlocking of the plastic guide block with the adjoining cam elements is advantageously achieved by this interaction. Secure fastening and guiding of the plastic guide block within the upper cam carrier is thus achieved.

A linear up and down movement of the plastic guide block is advantageously enabled by the interaction of the rounded lateral surfaces of the plastic guide block with the counter roundings of the adjoining cam elements. It is thus advantageously possible that the plastic guide block follows an adjustment of the upper pressure roller. Tests have shown that the friction between the rounded lateral surfaces and the counter roundings is advantageously reduced by the use of a plastic card block, whereby a low-maintenance and low-noise functionality of the safety cam provided as part of the plastic guide block is enabled. Furthermore, a high level of guiding accuracy and a direct, i.e., in particular not time delayed following of the safety cam during an adjustment of the upper pressure roller is achieved by the design of the rounded lateral surfaces of the plastic guide block.

It is preferable in terms of the present invention that the distance between a bottom dead center of the upper pressure roller and the punch heads of the upper punches has a minimal value of preferably 0.09 to 0.11 mm, particularly preferably 0.1 mm. However, it can also be preferable in a further preferred embodiment of the invention that the distance between the bottom dead center of the pressure roller and the punch heads of the upper punches has a greater value.

In a further preferred embodiment, the vertically-adjustable safety cam of the rotary press is fastened using fasteners, for example, screws, on the connector for connecting the safety cam to the upper pressure roller. A friction-locked and formfitting fastening of the safety rail cam on the connector is advantageously achieved by the use of fasteners, in particular screws. This friction-locked and formfitting connection advantageously enables the safety cam to be made vertically adjustable and also to follow an adjustment of the upper pressure roller synchronously.

In a further preferred embodiment of the invention, the safety cam is replaceable if needed. This is particularly advantageous if a safety cam has to be replaced due to wear.

In a further preferred embodiment, the safety rail according to the invention is replaceable in particular if a distance preferably greater than 0.09 to 0.11 mm, particularly preferably 0.1 mm, is present between the punch heads of the upper punches and the bottom dead center of the pressure roller and the safety cam, wherein the term "is present" is used in the meaning that such a distance is required for producing the pellets. A high level of flexibility for various areas of application of the rotary press according to the invention is achieved by the replaceability of the safety rail. The safety rail according to the invention can be used not only for those rotary presses in which a minimal distance is present between punch heads of the upper punches and bottom dead center of the upper pressure roller, but rather also for those rotary presses in which this distance has a greater value than 0.1 mm for special applications.

It is furthermore preferable that a rotary press which comprises multiple pressure stations can be equipped with multiple safety cams according to the invention. The decision as to whether a safety cam according to the invention is used is thus left up to the operator of the rotary press according to the invention. It is furthermore preferable that a rotary press having multiple pressure stations does not necessarily comprise a safety cam at every pressure station, if the corresponding cam sequence makes the use of the safety cams in the region of individual pressure stations superfluous.

The invention can also be used in particular to produce coated-core pellets. For this purpose, for example, two pressing-on stations and also an optional core insertion module can be provided within the rotary press. The second pressing-on station preferably comprises a second pressing-on roller without adjustable pressing-on cam. Upper punches and an upper punch guide can be arranged as part of the rotor upper part between the first and the second pressing-on station. It is preferable in terms of the invention that the guide block is provided arranged around the preliminary pressure roller of the preliminary pressure station, wherein the guide block preferably comprises a preliminary pressure roller receptacle. It is preferable that the preferably lateral semicircular guides of the guide block are mounted axially movably in the guide counterpart on the left side of the upper punch cam. It is furthermore preferable that the guide block having the integrated pressing-on cam is mounted on the first pressing-on roller, wherein the position of the pressing-on cam is preferably automatically adjustable with the adjustment of the upper pressure roller. It is thus advantageously possible to set the plunging depth of the upper punches in the die.

BRIEF DESCRIPTION OF THE DRAWINGS

The invention will be described in greater detail with the aid of exemplary embodiments and the following figures; in the figures.

DETAILED DESCRIPTION

Figure 1:
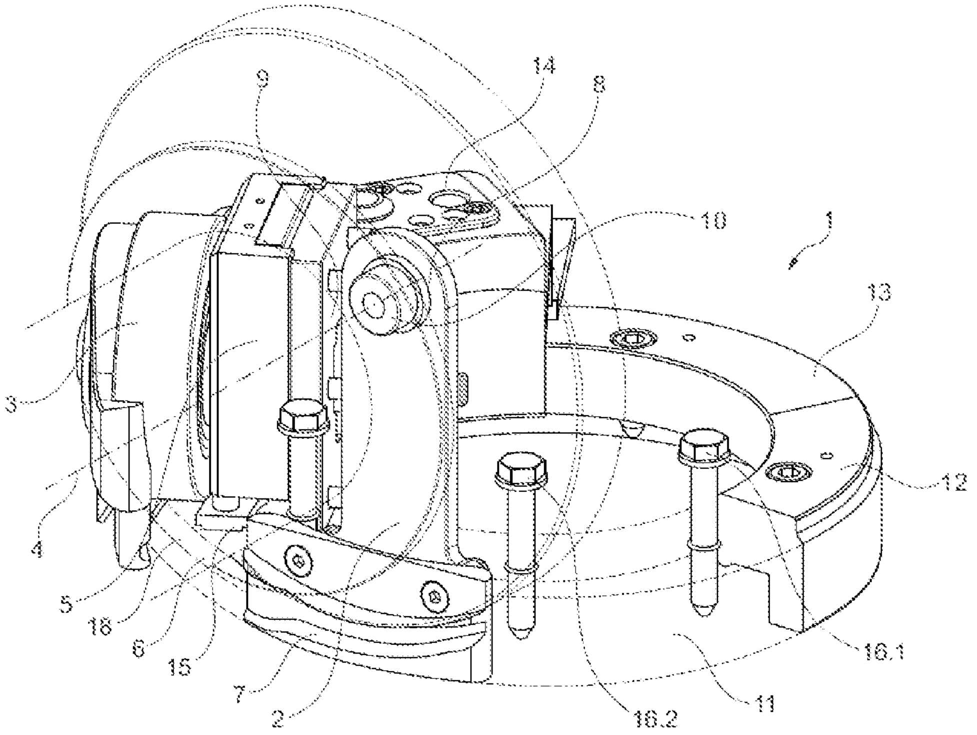
FIG. 1 shows a view of a preferred embodiment of the upper cam sequence of a rotary press having preliminary pressure and main pressure stations and safety rail

FIG. 1 shows a view of one preferred embodiment of the upper cam sequence (1) of a rotary press having preliminary pressure and main pressure stations and safety rail (7), in particular a view from a 10 o'clock position of the upper cam carrier (1) of a rotary press is shown. The cam sequence (1) is preferably formed, inter alia, by transfer rails (12, 13), which are used for fastening and accommodating further stations and the fasteners thereof, for example, screws. The preliminary pressure station comprises a preliminary pressure roller (3), which comprises a vertical adjustment (5), a transfer rail (6) to the main pressure roller (2), and a safety rail (7) having a mount (8) for the safety rail (7). It is preferable that the transfer rail (6) ensures the transition between preliminary pressure region and safety cam (7). A preliminary pressure of the tablet material to be compressed can advantageously be carried out in this preliminary pressure station. In the region of the preliminary pressure roller (3), the cam carrier (1) preferably comprises preliminary pressure rails, which are preferably formed by a pull-down rail (15) and a transfer rail (6). Following counterclockwise, the cam sequence (1) comprises a main pressure station having main pressure roller (2), using which the actual production of the tablet is performed. The main pressure roller (2) is preferably fastened using a pressure roller pin (9) on the pressure roller receptacle of a pressure roller station of the rotary press. A safety rail (7), which is preferably also referred to as a safety cam, is preferably provided below the main pressure roller (2). It is preferably fastened on the cam sequence (1) using a mount (8), wherein the mount (8) comprises a flanged bushing (10) having a hole (19). It is preferable that the safety rail (7) is connected in a simple manner via the flanged bushing (10) and the mount (8) to the pressure roller axis (4). The safety rail (7) is preferably located below the upper main pressure roller (2), preferably in the inner region of the cam sequence (1) behind the outer transfer rail (6) and the pull-up cam (11) (shown by dashed lines). The safety rail (7) is advantageously fastened on the mount (8) using the screws (17.1 and 17.2). It is preferable in particular that the safety cam (7) is provided connected by means of a connector (8), which is also referred to as a mount in the meaning of the invention, to the axis (4) of the upper pressure roller (2). At the upper end of the mount (8), a through hole (19) is located, into which the flanged bushing (10) protrudes, which is in turn fastened in the end face of the pressure roller pin (9) in a pocket hole.

The upper main pressure roller (2) can be adjusted in the height manually or automatically, whereby different plunging depths result for the upper punches (18) within the die hole. Due to the coupling of the safety rail (7) to the axis (4) of the main pressure roller (2), which can preferably be formed by a roller pin (4) of the main pressure roller (2), upon an adjustment of the position of the upper main pressure roller (2), the height position of the safety rail (7) is advantageously also changed automatically and synchronously. It is preferable that the safety rail (7) is located 0.1 mm plus the height of the punch head below the bottom dead center of the upper main pressure roller (2). This advantageously means that the upper punches (18) can never plunge more than 0.1 mm deeper beyond the set pressure roller position into the die.

The transfer rails (6 and 11), which are preferably also referred to as outer guide cams, are preferably adapted to the maximum permissible plunging depth of the rotary press. As long as the upper main pressure roller (2) is set to a lesser plunging depth than the maximum plunging depth during the tablet production, the upper punch heads will not touch the outer safety rails because of the inner safety cam (7). This represents an essential advantage of the invention with regard to the operational reliability of the rotary press.

It is preferable that the upper punches (18, not shown) are guided through below the pressure roller (2), wherein they are pressed downward by the passage below the pressure roller (2), wherein the tablets are pressed by interaction with the lower punches in the die holes. It is preferable that the safety cam (7), when observed, is provided arranged below the main pressure roller (3).

It is preferable that the preliminary pressure roller (3) is not equipped with a safety cam (7), since the guide rails in the region below the preliminary pressure rails do not permit greater plunging depths of the upper cams. In addition, screws (16.1 and 16.2) are shown in FIG. 1 as possible fasteners, which interact with a pull-up cam (11) of the main pressure cam (2) shown by dashed lines, which is preferably provided arranged between safety cam (7) and transfer rail (12). Furthermore, a connection (14) for a multifunction plug is visible.

Figure 2:
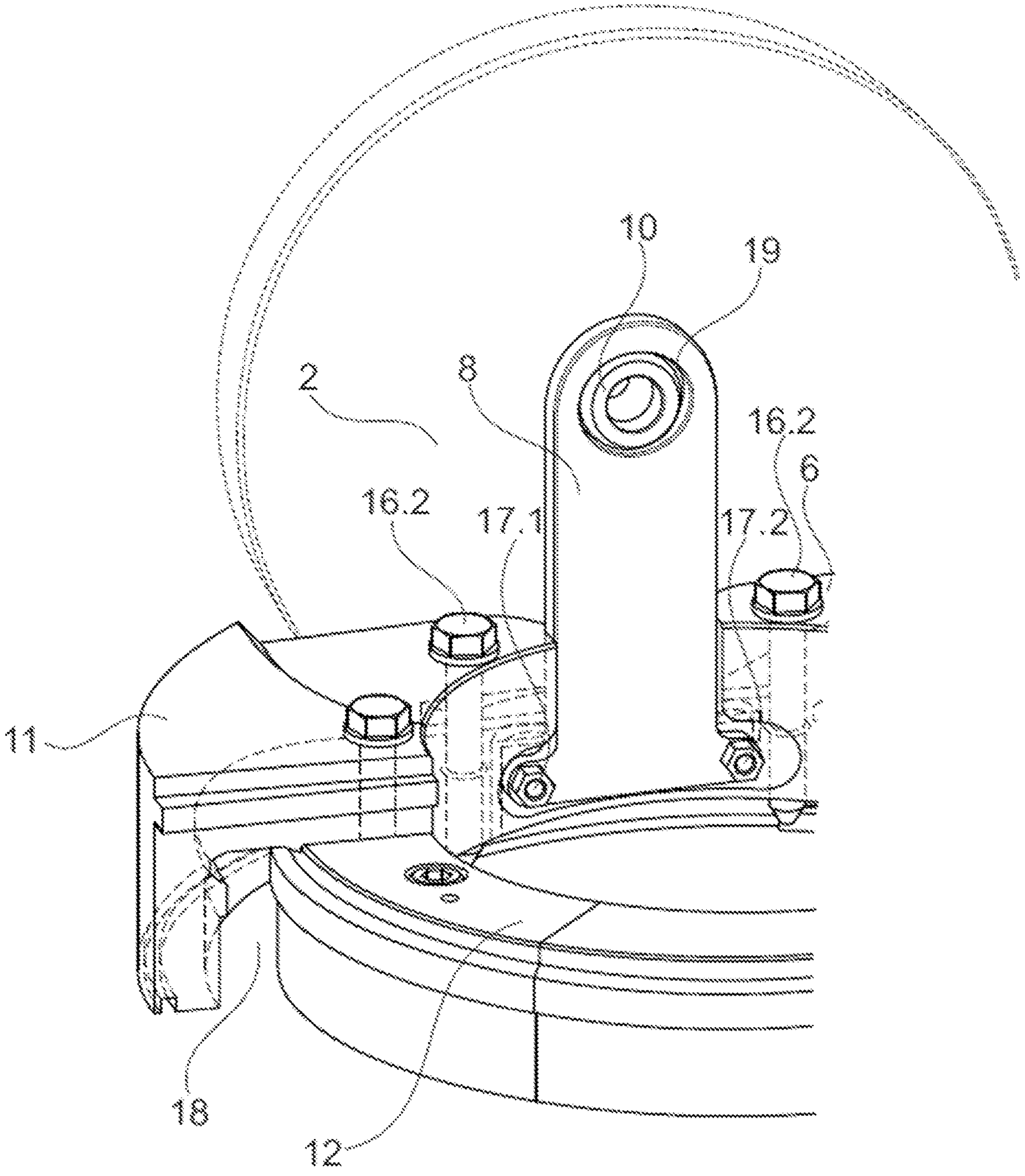
FIG. 2 shows a view of a preferred embodiment of the upper cam sequence with rear view of the preliminary pressure and main pressure stations

FIG. 2 shows a view of a preferred embodiment of the upper cam sequence (1) with rear view of the preliminary pressure and main pressure stations. The preliminary pressure roller (3) and the main pressure roller (2) are shown, wherein the vertical adjustment (5) is also visible with respect to the preliminary pressure roller (3). Observed from the front, i.e., from the outside, the pull-down cam (15) of the preliminary pressure roller (3) is arranged on the left side of the preliminary pressure roller (3), while the transfer rail (6) to the safety cam (7) is provided arranged on the right side observed from the front.

The safety cam (7) (not shown in FIG. 2) is arranged below the main pressure roller (2). It preferably has a mount (8), which is fastened using the fasteners (17.1 and 17.2), for example, screws, on the upper cam sequence (1). A flanged pushing (10) having a drilled hole (19) is preferably located in an opening in the upper, preferably rounded region of the mount (8) of the safety rail (7). It is particularly preferable if the transfer rail (6) and the pull-up cam (11) have rear recesses, which advantageously ensure a radial guide of the mount (8) of the safety rail (7). It is preferable that the upper punches (18, not shown here) can be guided in a region between the pull-up cam (11) of the main pressure roller (2) and the transfer rail (12) of the cam sequence (1). The pull-up cam (11) is fastened using fasteners (16.1 and 16.2), for example, screws, on the cam sequence (1).

Figure 3:
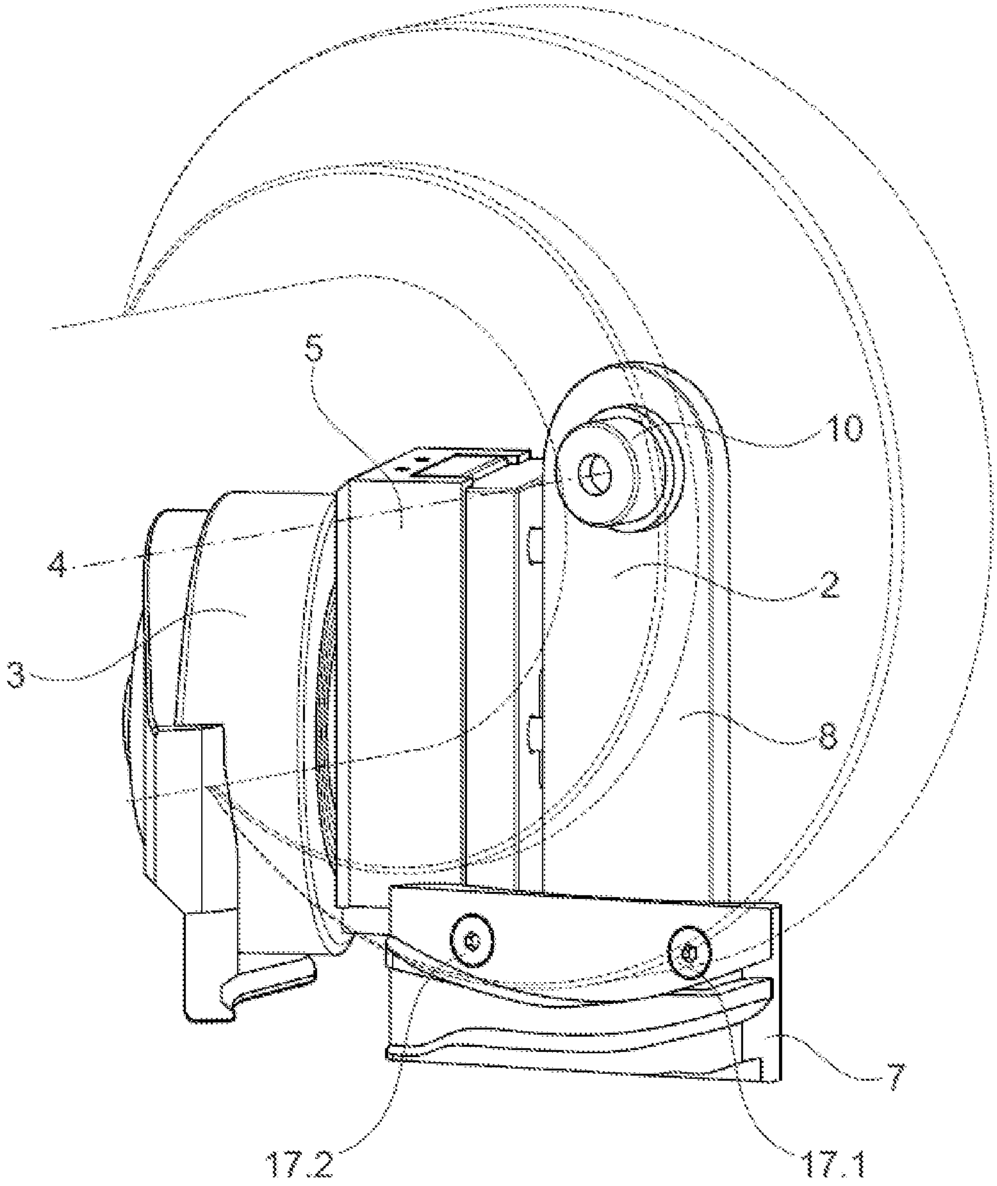
FIG. 3 shows a view of a preferred embodiment of the safety rail

FIG. 3 shows a view of a preferred embodiment of the safety rail (7). This is advantageously fastened using the screws (17.1 and 17.2) on the mount (8), is provided arranged behind the main pressure roller (2) observed from the outside and comprises an opening for accommodating a flanged bushing (10) in an upper region. The preliminary pressure station having preliminary pressure roller (3), which preferably does not have a safety rail (7), is preferably arranged clockwise from the outside. The preliminary pressure roller (3) is preferably designed to be vertically adjustable by means of a vertical adjustment (5). The reference sign 4 identifies the axis of the main pressure roller (2).

Figure 4:
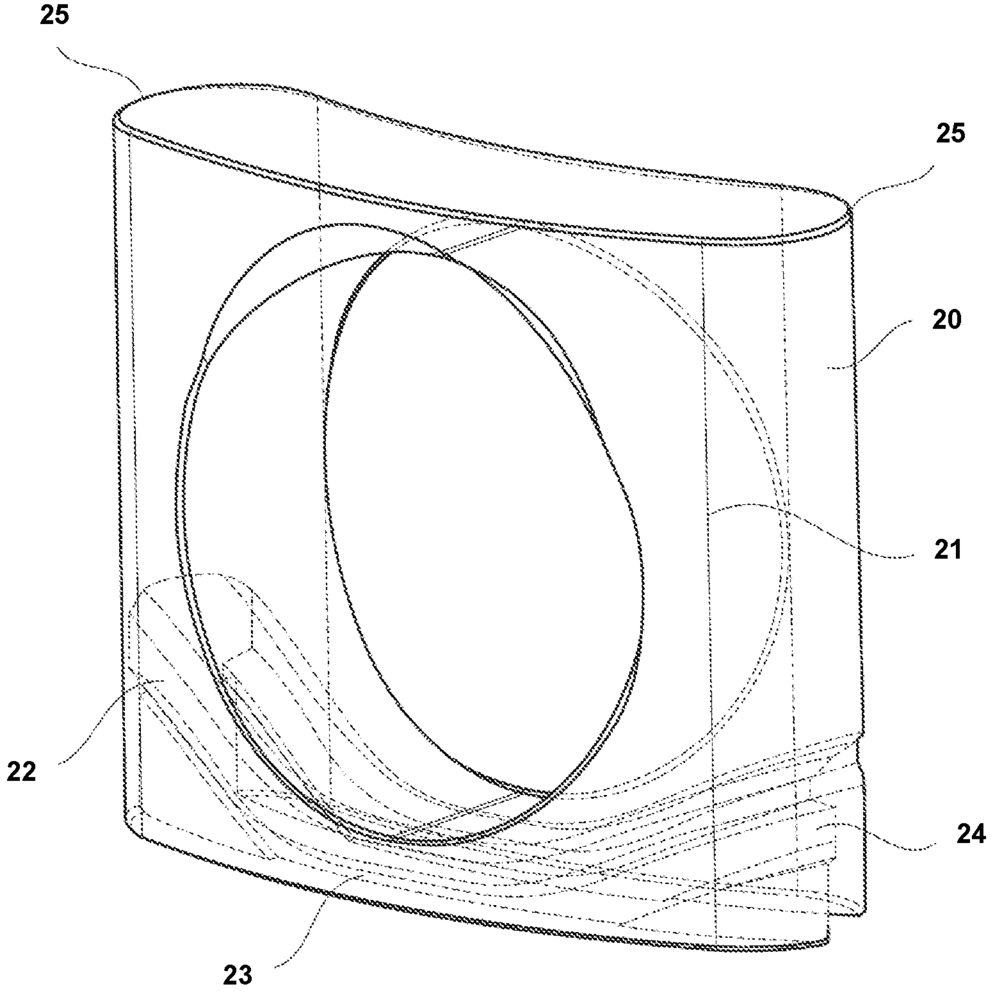
FIG. 4 shows a front view of a preferred embodiment of the guide block as an individual part having integrated pressing-on cam

FIG. 4 shows a front view of a preferred embodiment of the guide block (20) as an individual part having integrated pressing-on cam (22, 23, 24) and a receptacle hole (21) for the upper pressing-on roller (28, not shown). The integrated pressing-on cam is preferably formed by a pressing-on rail in the "pull-down" (22) region, a pressing-on rail in the "safety rail" (23) region, and a pressing-on rail in the "pull-up" (24) region, wherein the pressing-on rail forms a left region of the integrated pressing-on cam observed from the outside in the "pull-down" (22) region, the pressing-on rail forms a right region of the integrated pressing-on cam in the "pull-up" (24) region, and the pressing-on rail forms a middle region of the integrated pressing-on cam in the "safety rail" (23) region. The pressing-on rail is preferably arranged lower or deeper in the "safety rail" (23) region in comparison to the pressing-on rails in the "pull-down" (22) region and the pressing-on rails in the "pull-up" (24) region, which results from the pull-down and the pull-up function of the corresponding rails (22 and 24). It is particularly preferable if the guide block (20) comprises the integrated pressing-on rail (22, 23, 24) and it is provided integrated into the guide block (20). It is furthermore preferable that the integrated pressing-on rail (22, 23, 24) is referred to as a closed preliminary pressure cam in terms of the invention.

The receptacle hole (21) is preferably also referred to as a receptacle of the preliminary pressure roller (3) or as a preliminary pressure roller receptacle. It is preferable in terms of the invention that the adjustable pressing-on rail (22, 23, 24) is installed with the guide block (20) inside the rotary press and the first pressing-on station is located on the upper preliminary pressure roller (28). The first pressing-on station can preferably be, for example, a tamping station. The lateral semicircular guides (25), which are preferably formed as round guides, are preferably located on the right and left sides of an upper region of the illustrated preferred embodiment of the guide block (20) observed from the outside.

Figure 5:
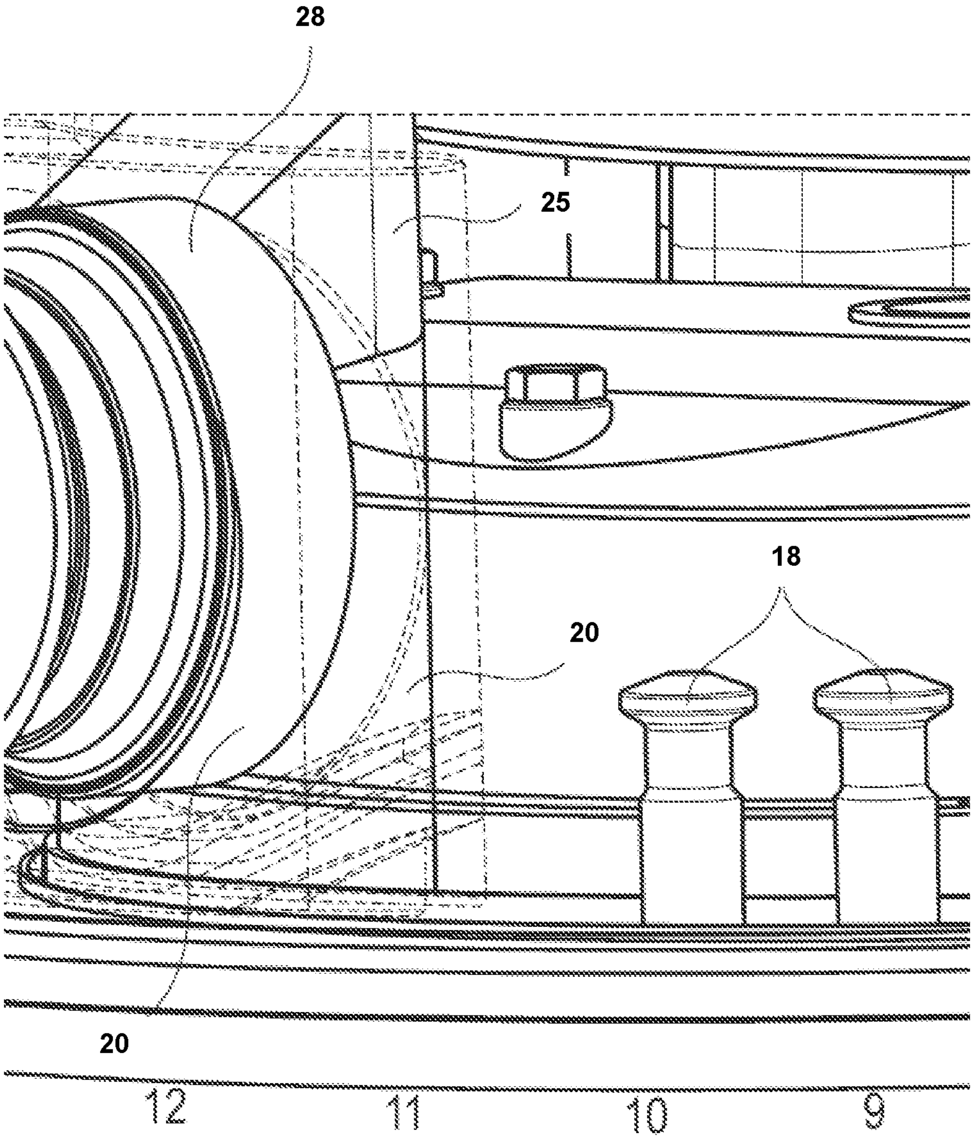
FIG. 5 shows a possible installation situation of a preferred embodiment of the guide block in a rotary press

FIG. 5 shows a possible installation situation of a preferred embodiment of the guide block (20) in a rotary press. The arrangement of the guide block (20) in relation to the upper preliminary pressure station (28) and the pressure roller pin (9) is shown. The guide block (20) preferably has a round guide (25) in the upper region. Furthermore, upper punches (32) and the guide heads thereof are shown, which interact with the pressure rollers in such a way that the upper punches (32) are pressed downward upon passage below the pressure rollers to mold the tablets or to effectuate a preliminary pressure in cooperation with the lower punches in the die holes.

LIST OF REFERENCE SIGNS

1 upper cam sequence of a rotary press
2 upper main pressure roller
3 preliminary pressure roller without safety rail
4 axis of main pressure roller
5 vertical adjustment of preliminary pressure roller
6 transfer rail preliminary pressure roller—safety rail
7 safety rail
8 mount of safety rail
9 end face of pressure roller pin
10 flanged bushing
11 pull-up cam
12 transfer rail

13 transfer rail
14 connection for multi-function plug
15 pull-down cam on the left side of the preliminary pressure roller
16.1 screw
16.2 screw
17.1 screw
17.2 screw
18 upper punch
19 hole
20 guide block
21 preliminary pressure roller receptacle
22 pressing-on rail in the "pull-down" region
23 pressing-on rail in the "safety rail" region
24 pressing-on rail in the "pull-up" region
25 round guide
28 upper preliminary pressure station

The invention claimed is:

1. A rotary press comprising:

at least one pressing station including a vertically-adjustable upper pressure roller and a vertically-adjustable lower pressure roller, each of the upper pressure roller and the lower pressure roller being mounted on an axis in the at least one pressing station, wherein cam-guided upper punches having punch heads are fed to the upper pressure roller using a control cam and a pull-up cam raises the upper punches to a highest point above a filling device, wherein a safety cam is provided in the at least one pressing station below the upper pressure roller, the safety cam being arranged vertically adjustable in relation to the upper pressure roller.

2. The rotary press as claimed in claim 1, wherein the vertically-adjustable safety cam has a minimum distance of 0.09 to 0.11 to the punch heads of the upper punches during a passage of the upper punches along a bottom dead center of the upper pressure roller.

3. The rotary press as claimed in claim 1 wherein the safety cam is connected to the axis of the upper pressure roller with a connector.

4. The rotary press as claimed in claim 1, wherein the adjustment of the safety cam in relation to the upper pressure roller is performed manually.

5. The rotary press as claimed in claim 3, wherein the connector has a hole, which is applied to a flanged bushing, wherein the flanged bushing attached to an end face of the axis of the upper pressure roller.

6. The rotary press as claimed in claim 3, wherein the connector is attached and/or guided by recesses in rear sides of a pull-down cam and a pull-up cam on an upper cam sequence.

7. The rotary press as claimed in claim 1, wherein the at least one pressing station is a preliminary pressure station having a vertically-adjustable upper preliminary pressure roller and a vertically-adjustable lower preliminary pressure roller, and wherein a closed preliminary pressure cam is arranged in the upper cam sequence of the at least one preliminary pressure station, which includes multiple cam elements.

8. The rotary press as claimed in claim 7, wherein the closed preliminary pressure cam forms a lower region of a guide block, which is integrated into the upper cam sequence of the at least one preliminary pressure station.

9. The rotary press as claimed in claim 8, wherein the guide block includes a front side, a rear side, lateral surfaces, and the front side and the rear side of the guide block have a uniform curve outward, wherein the curve of the front and rear sides of the guide block reproduces a circular footprint of a rotor of the rotary press.

10. The rotary press as claimed in claim 8, wherein the guide block includes a receptacle hole for the upper preliminary pressure roller.

11. The rotary press as claimed in claim 9, wherein the lateral surfaces of the guide block are rounded, wherein the rounded lateral surfaces engage in counter roundings of the adjoining cam elements in the upper cam sequence of the at least one preliminary pressure station at the guide block.

12. The rotary press as claimed in claim 2, wherein the vertically-adjustable safety cam-has a minimum distance of 0.1 mm to the punch heads of the upper punches during a passage of the upper punches along the bottom dead center of the upper pressure roller.

13. The rotary press as claimed in claim 1, wherein the adjustment of the safety cam in relation to the upper pressure roller is performed automatically.

* * * * *